US012671485B2

(12) United States Patent
Bhamri et al.

(10) Patent No.: US 12,671,485 B2
(45) Date of Patent: Jun. 30, 2026

(54) FULL-DUPLEX USER EQUIPMENT OPERATION

(71) Applicant: Lenovo (Singapore) Pte. Ltd., New Tech Park (SG)

(72) Inventors: Ankit Bhamri, Rödermark (DE); Seyedomid Taghizadeh Motlagh, Oberursel (DE); Ali Ramadan Ali, Kraiburg am Inn (DE); Karthikeyan Ganesan, Kronberg im Taunus (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 337 days.

(21) Appl. No.: 18/551,172

(22) PCT Filed: Mar. 16, 2022

(86) PCT No.: PCT/IB2022/052393
§ 371 (c)(1),
(2) Date: Sep. 18, 2023

(87) PCT Pub. No.: WO2022/195510
PCT Pub. Date: Sep. 22, 2022

(65) Prior Publication Data
US 2024/0171252 A1 May 23, 2024

Related U.S. Application Data

(60) Provisional application No. 63/161,804, filed on Mar. 16, 2021.

(51) Int. Cl.
H04B 7/06 (2006.01)
H04B 7/08 (2006.01)
(Continued)

(52) U.S. Cl.
CPC ....... H04B 7/06962 (2023.05); H04B 7/0696 (2023.05); H04L 5/14 (2013.01)

(58) Field of Classification Search
CPC .. H04B 7/06962; H04B 7/0696; H04B 7/063; H04B 7/088; H04B 7/024; H04L 5/14; H04L 5/0048
See application file for complete search history.

(56) References Cited

U.S. PATENT DOCUMENTS

2020/0068549 A1* 2/2020 Kang ..................... H04W 16/28
2020/0214018 A1* 7/2020 Venugopal .......... H04W 72/046
(Continued)

FOREIGN PATENT DOCUMENTS

WO        2020231803 A1    11/2020

OTHER PUBLICATIONS

PCT/IB2022/052393, "International Search Report and the Written Opinion of the International Searching Authority, or the Declaration", International Searching Authority, Jun. 14, 2022, pp. 1-15.
(Continued)

*Primary Examiner* — Harry H Kim
(74) *Attorney, Agent, or Firm* — Kunzler Needham Hilton

(57) ABSTRACT

Various aspects of the present disclosure relate to full-duplex user equipment operation. An apparatus includes at least one memory and at least one processor that is configured to cause the apparatus to receive a joint configuration defining uplink ("UL") and downlink ("DL") reference signal ("RS") resources for facilitating self-interference measurements for full-duplex UE operation, perform self-interference measurements according to the received joint configuration, report at least one UL transmission ("Tx") beam and DL reception ("Rx") beam pair, and receive at least one downlink control information ("DCI") for full-duplex operation for simultaneous UL transmission and DL reception associ- (Continued)

200 ated with at least two beams of at least one transmit/receive point ("TRP") based on the reported at least one UL Tx beam and DL Rx beam pair.

20 Claims, 6 Drawing Sheets

(51) Int. Cl.

| | |
|---|---|
| *H04B 7/24* | (2006.01) |
| *H04L 5/00* | (2006.01) |
| *H04L 5/14* | (2006.01) |

(56) References Cited

U.S. PATENT DOCUMENTS

| | | | | |
|---|---|---|---|---|
| 2020/0358500 | A1* | 11/2020 | Ryu ..................... | H04B 7/0695 |
| 2021/0351832 | A1* | 11/2021 | Zhang .................. | H04W 24/10 |
| 2022/0014346 | A1* | 1/2022 | Zhang ..................... | H04L 5/14 |
| 2022/0086658 | A1* | 3/2022 | Zhang .................. | H04L 5/0051 |
| 2023/0354300 | A1* | 11/2023 | Abotabl ............... | H04L 5/0051 |
| 2024/0163058 | A1* | 5/2024 | Taghizadeh Motlagh .................. | |
| | | | | H04L 5/0051 |

OTHER PUBLICATIONS

RAN1, "NR_feMIMO-Core", 3GPP TSG RAN WG1 Meeting #103-e R1-2009807, Oct. 26-Nov. 13, 2020, pp. 1-3.

3GPP, "3rd Generation Partnership Project; Technical Specification Group Radio Access Network; NR; Multiplexing and channel coding (Release 16)", 3GPP TS 38.212 V16.4.0, Dec. 2020, pp. 1-152.

3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.

* cited by examiner

600

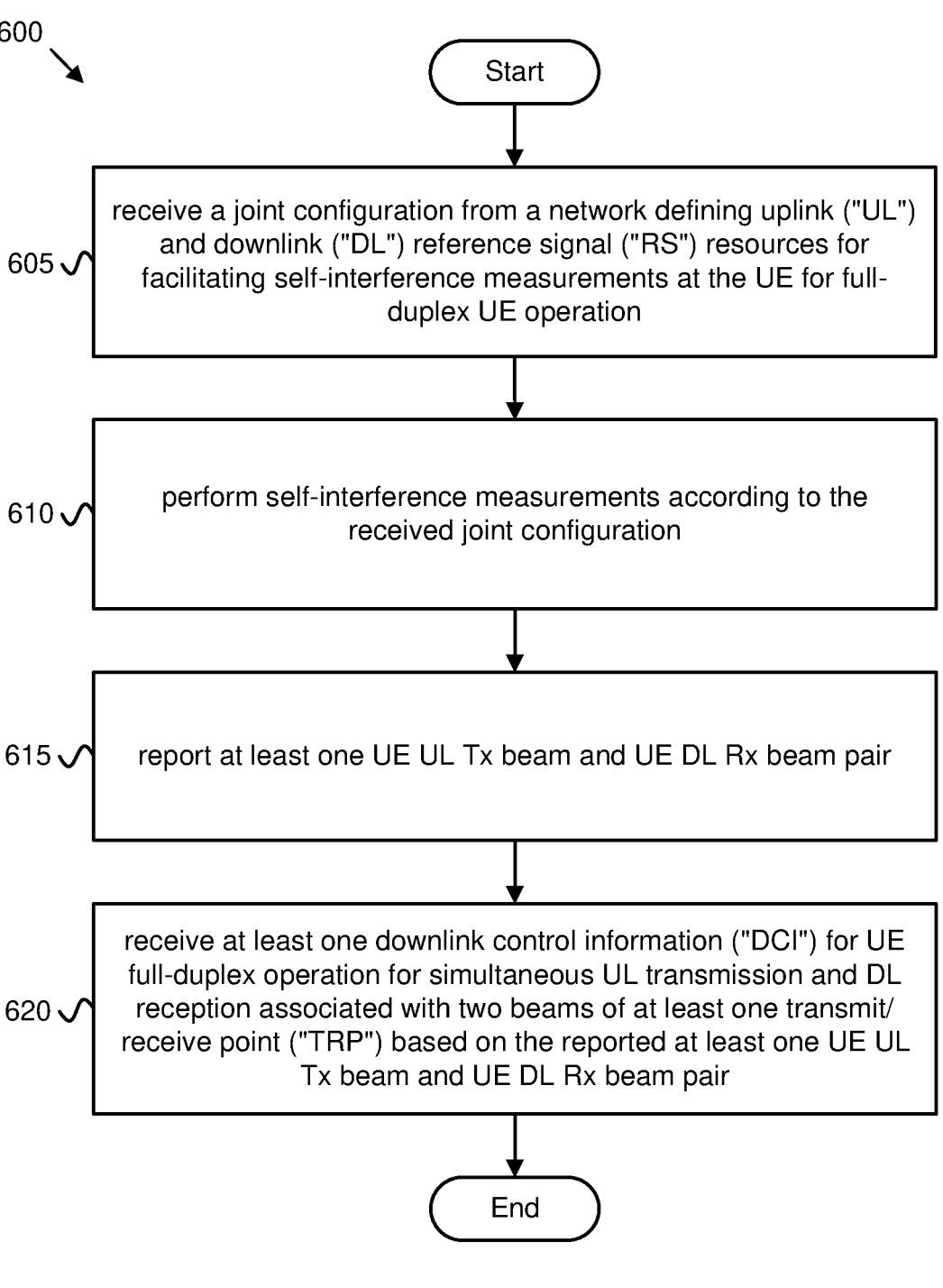

Start

605 — receive a joint configuration from a network defining uplink ("UL") and downlink ("DL") reference signal ("RS") resources for facilitating self-interference measurements at the UE for full-duplex UE operation 610 — perform self-interference measurements according to the received joint configuration 615 — report at least one UE UL Tx beam and UE DL Rx beam pair 620 — receive at least one downlink control information ("DCI") for UE full-duplex operation for simultaneous UL transmission and DL reception associated with two beams of at least one transmit/receive point ("TRP") based on the reported at least one UE UL Tx beam and UE DL Rx beam pair End

FIG. 6

FULL-DUPLEX USER EQUIPMENT OPERATION

CROSS-REFERENCE TO RELATED APPLICATIONS

This application claims the benefit of U.S. Provisional Patent Application No. 63/161,804, entitled "FULL-DU-PLEX UE OPERATION WITH MULTIPLE BEAMS/TRPS FOR DL AND UL" and filed on Mar. 16, 2021, for Ankit Bhamri et al., which is incorporated herein by reference.

FIELD

The subject matter disclosed herein relates generally to wireless communications and more particularly relates to full-duplex user equipment operation.

BACKGROUND

In wireless networks, full-duplex ("FD") operation is characterized by the capability to concurrently transmit and receive at the same time and frequency resource, which is facilitated by the means of self-interference cancellation ("SIC") at an FD node.

BRIEF SUMMARY

Disclosed are solutions for full-duplex user equipment operation. The solutions may be implemented by apparatus, systems, methods, or computer program products.

In one embodiment, a first apparatus includes a transceiver that receives a joint configuration from a network defining uplink ("UL") and downlink ("DL") reference signal ("RS") resources for facilitating self-interference measurements at the UE for full-duplex UE operation and a processor that performs self-interference measurements according to the received joint configuration. In one embodiment, the transceiver reports at least one UE UL Tx beam and UE DL Rx beam pair and receives at least one downlink control information ("DCI") for UE full-duplex operation for simultaneous UL transmission and DL reception associated with two beams of at least one transmit/receive point ("TRP") based on the reported at least one UE UL Tx beam and UE DL Rx beam pair.

In one embodiment, a first method receives a joint configuration from a network defining uplink ("UL") and downlink ("DL") reference signal ("RS") resources for facilitating self-interference measurements at the UE for full-duplex UE operation and a processor that performs self-interference measurements according to the received joint configuration. In one embodiment, the first method reports at least one UE UL Tx beam and UE DL Rx beam pair and receives at least one downlink control information ("DCI") for UE full-duplex operation for simultaneous UL transmission and DL reception associated with two beams of at least one transmit/receive point ("TRP") based on the reported at least one UE UL Tx beam and UE DL Rx beam pair.

In one embodiment, a second apparatus includes a transceiver that transmits a joint configuration to a user equipment ("UE") device defining uplink ("UL") and downlink ("DL") reference signal ("RS") resources for facilitating self-interference measurements at the UE for full-duplex UE operation, receives at least one UE UL Tx beam and UE DL Rx beam pair from the UE, and transmits at least one downlink control information ("DCI") for UE full-duplex operation for simultaneous UL transmission and DL reception associated with two beams of at least one transmit/receive point ("TRP") based on the reported at least one UE UL Tx beam and UE DL Rx beam pair.

In one embodiment, a second method transmits a joint configuration to a user equipment ("UE") device defining uplink ("UL") and downlink ("DL") reference signal ("RS") resources for facilitating self-interference measurements at the UE for full-duplex UE operation, receives at least one UE UL Tx beam and UE DL Rx beam pair from the UE, and transmits at least one downlink control information ("DCI") for UE full-duplex operation for simultaneous UL transmission and DL reception associated with two beams of at least one transmit/receive point ("TRP") based on the reported at least one UE UL Tx beam and UE DL Rx beam pair.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6 is a flowchart diagram illustrating one embodiment of a method for full-duplex user equipment operation.

DETAILED DESCRIPTION

Figure 1:
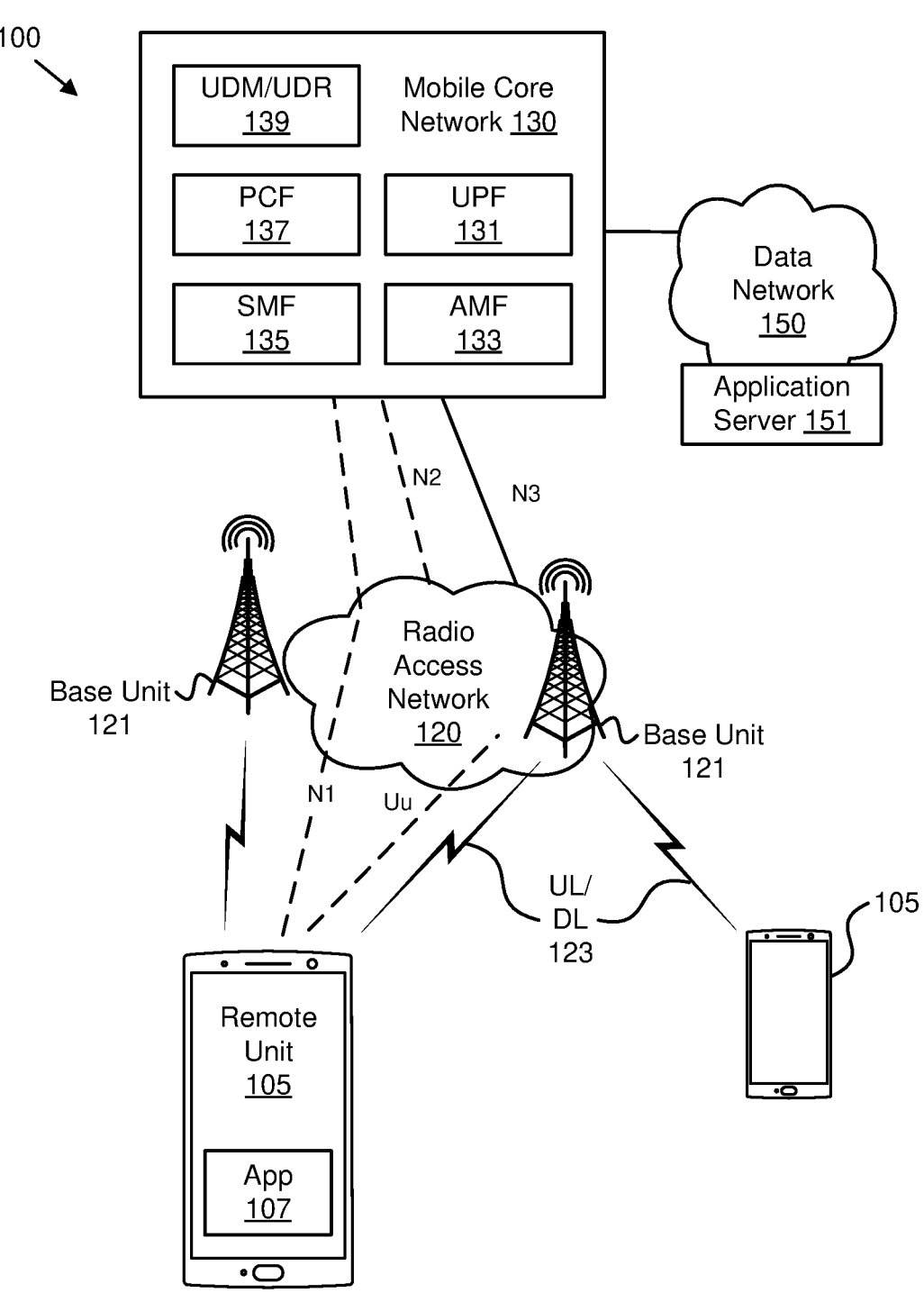
FIG. 1 is a schematic block diagram illustrating one embodiment of a wireless communication system for full-duplex user equipment operation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for full-duplex user equipment operation. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

In general, full-duplex ("FD") operation is characterized by the capability to concurrently transmit and receive at the same time and frequency resource, which is facilitated by the means of self-interference cancellation ("SIC") at an FD node. The FD operation at a gNB facilitates reception from a group of UEs in the uplink ("UL") transmission simultaneously with the downlink ("DL") transmission to another (and potentially disjoint) group of UEs coexisting at the same channel. As a result, there is potential for an enhanced spectral efficiency and a reduced latency.

However, FD operation for UEs is not supported or made possible in third generation partnership project ("3GPP") new radio ("NR"). Considering the benefits in terms of spectral efficiency and reduced latency, in this disclosure, solutions are presented to facilitate FD operation UE in NR, especially in mmWave or beamformed transmission/reception for FR2 and beyond 52.6 GHz. Specifically, solutions are discussed to facilitate FD operation UE with multiple transmit/receive points ("TRPs") where the self-interference at the UE can be minimized including:

How UE assistance can be utilized for UE FD operation with multiple beams/TRPs; and How single-DCI and multi-DCI multi-TRP framework in NR can be enhanced to support FD UE operation.

Furthermore, the solutions herein describe embodiments directed to joint configuration of UL-DL reference signal ("RS") resource/resource sets for self-interference measurements/reporting for FD UE operation including pairing of UL Tx beam and DL Rx beam for simultaneous transmission and reception based on one and/or multiple TRPs. Another embodiment describes reporting to indicate a pair of UL Tx beams/TRPs and DL Rx beams/TRPs for UE FD operation. In yet another embodiment, a single downlink control information ("DCI") for FD UE operation with multiple TRPs is proposed including corresponding details related to demodulation reference signal ("DMRS") port indication, time domain resource assignment ("TDRA"), and frequency domain resource assignment ("FDRA"). In one embodiment, multi-DCI for FD UE operation with multiple TRPs is proposed including procedures to determine the required conditions for FD UE operation when there is lack of dynamic coordination between TRPs.

FIG. 1 depicts a wireless communication system 100 supporting full-duplex user equipment operation, according to embodiments of the disclosure. In one embodiment, the wireless communication system 100 includes at least one remote unit 105, a radio access network ("RAN") 120, and a mobile core network 130. The RAN 120 and the mobile core network 130 form a mobile communication network. The RAN 120 may be composed of a base unit 121 with which the remote unit 105 communicates using wireless communication links 115. Even though a specific number of remote units 105, base units 121, wireless communication links 115, RANs 120, and mobile core networks 130 are depicted in FIG. 1, one of skill in the art will recognize that any number of remote units 105, base units 121, wireless communication links 115, RANs 120, and mobile core networks 130 may be included in the wireless communication system 100.

In one implementation, the RAN 120 is compliant with the 5G system specified in the Third Generation Partnership Project ("3GPP") specifications. For example, the RAN 120 may be a New Generation Radio Access Network ("NG-RAN"), implementing NR RAT and/or 3GPP Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 130.

In some embodiments, the remote units 105 communicate with an application server via a network connection with the mobile core network 130. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 130 via the RAN 120. The mobile core network 130 then relays traffic between the remote unit 105 and the application server (e.g., the content server 151 in the packet data network 150) using the PDU session. The PDU session represents a logical connection between the remote unit 105 and the User Plane Function ("UPF") 131.

In order to establish the PDU session (or PDN connection), the remote unit 105 must be registered with the mobile core network 130 (also referred to as "attached to the mobile core network" in the context of a Fourth Generation ("4G") system). Note that the remote unit 105 may establish one or more PDU sessions (or other data connections) with the mobile core network 130. As such, the remote unit 105 may have at least one PDU session for communicating with the packet data network 150, e.g., representative of the Internet. The remote unit 105 may establish additional PDU sessions for communicating with other data networks and/or other communication peers.

In the context of a 5G system ("5GS"), the term "PDU Session" a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QOS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 130 via the RAN 120.

The base units 121 may serve several remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 130 is a 5GC or an Evolved Packet Core ("EPC"), which may be coupled to a packet data network 150, like the Internet and private data networks, among other data networks. A remote unit 105 may have a subscription or other account with the mobile core network 130. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes at least one UPF 131. The mobile core network 130 also includes multiple control plane ("CP") functions including, but not limited to, an Access and Mobility Management Function ("AMF") 133 that serves the RAN 120, a Session Management Function ("SMF") 135, a Network Exposure Function ("NEF") 136, a Policy Control Function ("PCF") 137, a Unified Data Management function ("UDM") and a User Data Repository ("UDR").

The UPF(s) 131 is responsible for packet routing and forwarding, packet inspection, QoS handling, and external PDU session for interconnecting Data Network (DN), in the 5G architecture. The AMF 133 is responsible for termination of NAS signaling, NAS ciphering & integrity protection, registration management, connection management, mobility management, access authentication and authorization, security context management. The SMF 135 is responsible for session management (i.e., session establishment, modification, release), remote unit (i.e., UE) IP address allocation & management, DL data notification, and traffic steering configuration for UPF for proper traffic routing.

The NEF 136 is responsible for making network data and resources easily accessible to customers and network partners. Service providers may activate new capabilities and expose them through APIs. These APIs allow third-party authorized applications to monitor and configure the network's behavior for a number of different subscribers (i.e., connected devices with different applications). The PCF 137 is responsible for unified policy framework, providing policy rules to CP functions, access subscription information for policy decisions in UDR.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 139.

In various embodiments, the mobile core network 130 may also include an Authentication Server Function ("AUSF") (which acts as an authentication server), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 130 may include an authentication, authorization, and accounting ("AAA") server.

In various embodiments, the mobile core network 130 supports different types of mobile data connections and different types of network slices, wherein each mobile data connection utilizes a specific network slice. Here, a "network slice" refers to a portion of the mobile core network 130 optimized for a certain traffic type or communication service. A network instance may be identified by a single-network slice selection assistance information ("S-NSSAI,") while a set of network slices for which the remote unit 105 is authorized to use is identified by network slice selection assistance information ("NSSAI").

Here, "NSSAI" refers to a vector value including one or more S-NSSAI values. In certain embodiments, the various network slices may include separate instances of network functions, such as the SMF 135 and UPF 131. In some embodiments, the different network slices may share some common network functions, such as the AMF 133. The different network slices are not shown in FIG. 1 for ease of illustration, but their support is assumed. Where different network slices are deployed, the mobile core network 130 may include a Network Slice Selection Function ("NSSF") which is responsible for selecting of the Network Slice instances to serve the remote unit 105, determining the allowed NSSAI, determining the AMF set to be used to serve the remote unit 105.

Although specific numbers and types of network functions are depicted in FIG. 1, one of skill in the art will recognize that any number and type of network functions may be included in the mobile core network 130. Moreover, in an LTE variant where the mobile core network 130 comprises an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 133 may be mapped to an MME, the SMF 135 may be mapped to a control plane portion of a PGW and/or to an MME, the UPF 131 may be mapped to an SGW and a user plane portion of the PGW, the UDM/UDR 139 may be mapped to an HSS, etc.

While FIG. 1 depicts components of a 5G RAN and a 5G core network, the described embodiments apply to other types of communication networks and RATs, including IEEE 802.11 variants, Global System for Mobile Communications ("GSM", i.e., a 2G digital cellular network), General Packet Radio Service ("GPRS"), UMTS, LTE variants, CDMA 2000, Bluetooth, ZigBee, Sigfox, and the like.

In the following descriptions, the term "gNB" is used for the base station but it is replaceable by any other radio access node, e.g., RAN node, eNB, Base Station ("BS"), Access Point ("AP"), NR, etc. Further the operations are described mainly in the context of 5G NR. However, the proposed solutions/methods are also equally applicable to other mobile communication systems supporting channel state information ("CSI") enhancements for higher frequencies.

As background, according to clause 5.1 in 3GPP TS 38.214, the following procedures for receiving PDSCH from multiple TRPs have been specified:

If a UE is configured by higher layer parameter PDCCH-Config that contains two different values of coresetPoolIndex in ControlResourceSet, the UE may expect to receive multiple physical downlink control channels ("PDCCHs") scheduling fully/partially/non-overlapped PDSCHs in time and frequency domain. The UE may expect the reception of full/partially overlapped PDSCHs in time only when PDCCHs that schedule two PDSCHs are associated to different ControlResourceSets having different values of coresetPoolIndex. For a ControlResourceSet without coresetPoolIndex, the UE may assume that the ControlResourceSet is assigned with coresetPoolIndex as 0. When the UE is scheduled with full/partially/non-overlapped PDSCHs in time and frequency domain, the full scheduling information for receiving a PDSCH is indicated and carried only by the corresponding PDCCH, the UE is expected to be scheduled with the same active BWP and the same SCS. When the UE is scheduled with full/partially overlapped PDSCHs in time and frequency domain, the UE can be scheduled with at most two codewords simultaneously. When PDCCHs that schedule two PDSCHs are associated to different ControlResourceSets having different values of coresetPoolIndex, the following operations are allowed:

For any two hybrid automatic repeat request ("HARQ") process IDs in a given scheduled cell, if the UE is scheduled to start receiving a first PDSCH starting in symbol j by a PDCCH associated with a value of coresetPoolIndex ending in symbol i, the UE can be scheduled to receive a PDSCH starting earlier than the end of the first PDSCH with a PDCCH associated with a different value of coresetPoolIndex that ends later than symbol i.

In a given scheduled cell, the UE can receive a first PDSCH in slot i, with the corresponding HARQ-ACK assigned to be transmitted in slot j, and a second PDSCH associated with a value of coresetPoolIndex different from that of the first PDSCH starting later than the first PDSCH with its corresponding HARQ-ACK assigned to be transmitted in a slot before slot j.

If PDCCHs that schedule corresponding PDSCHs are associated to the same or different ControlResourceSets having the same value of coresetPoolIndex, the UE procedure for receiving the PDSCH upon detection of a PDCCH follows Clause 5.1.

A UE does not expect to be configured with repetitionScheme if the UE is configured with higher layer parameter repetitionNumber.

When a UE is configured by higher layer parameter repetitionScheme set to one of 'fdmSchemeA', 'fdmSchemeB', 'tdmSchemeA', if the UE is indicated with two TCI states in a codepoint of the DCI field 'Transmission Configuration Indication' and DM-RS port(s) within one code division multiplexing ("CDM") group in the DCI field 'Antenna Port(s)'.

When two TCI states are indicated in a DCI and the UE is set to 'fdmSchemeA', the UE shall receive a single PDSCH transmission occasion of the TB with each TCI state associated to a non-overlapping frequency domain resource allocation as described in Clause 5.1.2.3.

When two TCI states are indicated in a DCI and the UE is set to 'fdmSchemeB', the UE shall receive two PDSCH transmission occasions of the same TB with each TCI state associated to a PDSCH transmission occasion which has non-overlapping frequency domain resource allocation with respect to the other PDSCH transmission occasion as described in Clause 5.1.2.3.

When two TCI states are indicated in a DCI and the UE is set to 'tdmSchemeA', the UE shall receive two PDSCH transmission occasions of the same TB with each TCI state associated to a PDSCH transmission occasion which has non-overlapping time domain resource allocation with respect to the other PDSCH transmission occasion and both PDSCH transmission occasions shall be received within a given slot as described in Clause 5.1.2.1.

When a UE is configured by the higher layer parameter repetitionNumber in PDSCH-TimeDomainResourceAllocation, the UE may expect to be indicated with one or two TCI states in a codepoint of the DCI field 'Transmission Configuration Indication' together with the DCI field 'Time domain resource assignment' indicating an entry which contains repetitionNumber in PDSCH-TimeDomainResourceAllocation and DM-RS port(s) within one CDM group in the DCI field 'Antenna Port(s)'.

When two TCI states are indicated in a DCI with 'Transmission Configuration Indication' field, the UE may expect to receive multiple slot level PDSCH transmission occasions of the same TB with two TCI states used across multiple PDSCH transmission occasions in the repetitionNumber consecutive slots as defined in Clause 5.1.2.1.

When one TCI state is indicated in a DCI with 'Transmission Configuration Indication' field, the UE may expect to receive multiple slot level PDSCH transmission occasions of the same TB with one TCI state used across multiple PDSCH transmission occasions in the repetitionNumber consecutive slots as defined in Clause 5.1.2.1.

When a UE is not indicated with a DCI that DCI field 'Time domain resource assignment' indicating an entry which contains repetitionNumber in PDSCH-TimeDomainResourceAllocation, and it is indicated with two TCI states in a codepoint of the DCI field 'Transmission Configuration Indication' and DM-RS port(s) within two CDM groups in the DCI field 'Antenna Port(s)', the UE may expect to receive a single PDSCH where the association between the DM-RS ports and the TCI states are as defined in Clause 5.1.6.2.

When a UE is not indicated with a DCI that DCI field 'Time domain resource assignment' indicating an entry which contains repetitionNumber in PDSCH-TimeDomainResourceAllocation, and it is indicated with one TCI states in a codepoint of the DCI field 'Transmission Configuration Indication', the UE procedure for receiving the PDSCH upon detection of a PDCCH follows Clause 5.1.

If more than one PDSCH on a serving cell each without a corresponding PDCCH transmission are in a slot, after resolving overlapping with symbols in the slot indicated as uplink by tdd-UL-DL-ConfigurationCommon, or by tdd-UL-DL-ConfigurationDedicated, a UE receives one or more PDSCHs without corresponding PDCCH transmissions in the slot as specified below.

Step 0: set j=0, where j is the number of selected PDSCH(s) for decoding. Q is the set of activated PDSCHs without corresponding PDCCH transmissions within the slot.

Step 1: A UE receives one PDSCH with the lowest configured sps-ConfigIndex within Q, set j=j+1. Designate the received PDSCH as survivor PDSCH.

Step 2: The survivor PDSCH in step 1 and any other PDSCH(s) overlapping (even partially) with the survivor PDSCH in step 1 are excluded from Q.

Step 3: Repeat step 1 and 2 until Q is empty or j is equal to the number of unicast PDSCHs in a slot supported by the UE.

Regarding Multi-TRP enhancements for PDCCH, PUSCH, and PUCCH, it is assumed that for PDCCH reliability enhancements with non-SFN schemes and Option 2+Case 1, support Alt3 (two synchronization signal ("SS") sets associated with corresponding CORESETs).

When DL DCI is transmitted via PDCCH repetition, for physical uplink control channel ("PUCCH") resource determination for HARQ-Ack when the corresponding PUCCH resource set has a size larger than eight, starting CCE index and number of CCEs in the CORESET of one of the linked PDCCH candidates is applied. Down-select one of the following options in RAN1 #104-bis-e Option 1: The one with the lowest CORESET ID is applied.

Option 2: The one with the lowest SS set ID is applied.

For Option 2, at least for the following purposes, a reference PDCCH candidate is defined as the candidate that ends later in time among the two linked PDCCH candidates in the time domain:

To determine the scheduling offset to identify whether a default beam should be used for PDSCH/CSI-RS reception.

To extend the definition of in-order for PDCCH-PDSCH and PDCCH-PUSCH, i.e., PDCCH ending symbol is the last symbol of the reference PDCCH candidate in at least the following restrictions in 38.214.

1. For any two HARQ process IDs in a given scheduled cell, if the UE is scheduled to start receiving a first PDSCH starting in symbol j by a PDCCH ending in symbol I, the UE is not expected to be scheduled to receive a PDSCH starting earlier than the end of the first PDSCH with a PDCCH that ends later than symbol i.

2. For any two HARQ process IDs in a given scheduled cell, if the UE is scheduled to start a first physical uplink shared channel ("PUSCH") transmission starting in symbol j by a PDCCH ending in symbol I, the UE is not expected to be scheduled to transmit a PUSCH starting earlier than the end of the first PUSCH by a PDCCH that ends later than symbol i.

For PUSCH preparation time (N2) and CSI computation time (Z): Last symbol of the PDCCH is based on the last symbol of the reference PDCCH candidate.

FFS: If inter-slot PDCCH repetition is supported, for slot offset for scheduling the same PDSCH/PUSCH/CSI-RS/SRS: The slot of the reference PDCCH candidate is used as the reference slot.

If two PDCCH candidates that are linked for repetition do not belong to the same PDCCH monitoring occasion, the earlier PDCCH monitoring occasion is used as the reference for the following:

Definition of counter downlink assignment index ("DAI")/total DAI and Type-2 HARQ-Ack codebook construction.

Determining the last DCI for PUCCH resource determination based on the PRI field of the last DCI.

For PDCCH repetition, support linking two SS sets by radio resource control ("RRC") configuration:

When PDCCH repetition is monitored in two linked SS sets, the UE does not expect a third monitored SS set to be linked with any of the two linked SS sets.

The two linked SS sets have the same SS set type (USS/CSS)

1. The two linked SS sets have the same DCI formats to monitor

For intra-slot PDCCH repetition,

1. The two SS sets should have the same periodicity and offset (monitoringSlotPeriodicityAndOffset), and the same duration 2. For linking monitoring occasions across the two SS sets that exist in the same slot:

The two SS sets have the same number of monitoring occasions within a slot and n-th monitoring occasion of one SS set is linked to n-th monitoring occasion of the other SS set For a number of blind decodings ("BDs") corresponding to two PDCCH candidates that are linked for PDCCH repetition, down-select one of the following options in RAN1 #104-bis-e Option 1: UE reports one or more numbers as required number of BDs for the two PDCCH candidates 1. Candidate values: 2, X.

Where X is a value larger than 2 and equal or less than 3

Option 2: UE reports whether it supports soft-combining or not

1. If soft-combining is supported, UE further reports one or more numbers as required number of BDs for the two PDCCH candidates Candidate values: 2, X.

i. Where X is a value larger than 2 and equal or less than 3

Option 3: UE reports one or more decoding assumptions out of decoding assumptions 1-4

1. Number of BDs for decoding assumptions 1:

Alt1: 2 BDs

Alt2: A value between 1 and 2 BDs

2. Number of BDs for decoding assumption 2: 2

3. Number of BDs for decoding assumption 3: 2

4. Number of BDs for decoding assumption 4: 3

Option 4: Always 2 BDs are assumed irrespective of UE's decoding assumption

Option 5: Always 3 BDs are assumed irrespective of UE's decoding assumption

At least for FR1, if a PDSCH is scheduled by a DCI in PDCCH candidates that are linked for repetition, and the resources in the CORESET(s) containing the PDCCH candidates overlap with the resources of the PDSCH, the PDSCH is rate matched around the union of two PDCCH candidates and the corresponding DMRS.

Note: This does not imply that two linked PDCCH candidates can/cannot be overlapping in resources, which is a separate discussion.

When two SS sets are linked for PDCCH repetition, they do not contain individual PDCCH candidates.

Note 1: For configuration of individual PDCCH candidates, a different SS set can be configured by network.

Note 2: When one of the linked PDCCH candidates uses the same set of CCEs as an individual PDCCH candidate, and they both are associated with the same DCI size, scrambling, and CORESET, Rel. 15 rule is followed with respect to not counting an additional BD.

For PDCCH repetition, two PDCCH candidates in two SS sets are linked based on

Having the same aggregation level ("AL") and the same candidate index:

1. Two linked SS sets are configured with the same number of candidates for each AL.

The agreed PDCCH repetition framework (Option 2+Case 1+Alt3) supports both TDM and FDM multiplexing schemes.

For single DCI based M-TRP PUSCH repetition Type B, the following RV mapping is supported:

DCI indicates the first RV for the first PUSCH actual repetition, and the RV pattern (0 2 3 1) is applied separately to PUSCH actual repetitions of different TRPs with a possibility of configuring RV offset for the starting RV for the first actual repetition towards second TRP (The same method as PDSCH scheme 4).

CG PUSCH transmission towards M-TRPs using a single CG configuration is supported.

Use same beam mapping principals as dynamic grant PUSCH repetition scheme.

The feature is UE optional

For M-TRP PUCCH scheme 1, support PUCCH formats 0 and 2 (in addition to agreed PUCCH formats 1,3,4)

For M-TRP PUCCH scheme 1,

For PUCCH formats 1/3/4, values for the total number of repetitions at least contain values 2, 4, and 8.

For PUCCH formats 0/2, the total number of repetitions at least contain 2.

RRC configured number of slots (repetitions) are applied across both TRPs (e.g., if the number of repetitions given by nrofSlots in PUCCH-config is 8, per TRP limit is 4).

To support per TRP power control for multi-TRP PUCCH schemes in FR1,

Two sets of power control parameters are used, and each set has a dedicated value of p0, pathloss RS ID and a closed-loop index.

For single-DCI based M-TRP PUSCH repetition schemes, up to two power control parameter sets (using SRI-PUSCH-PowerControl) can be applied when sounding reference signal ("SRS") resources from two SRS resource sets indicated in DCI format 0_1/0_2.

For PUCCH reliability enhancement, support multi-TRP intra-slot repetition (Scheme 3) for all PUCCH formats.

The same PUCCH resource carrying UCI is repeated for X=2 [consecutive] sub-slots within a slot.

Refer the design details related to sub-slot configurations (e.g., other values of X) to Rel-17 eIIoT.

Note1: The decision of supporting scheme 3 is only applicable for multi-TRP operation.

For Multi-TRP PUCCH Scheme 1/3 at least containing HARQ ACK, supporting dynamic switching between multi-TRP PUCCH scheme and single-TRP PUCCH transmission is not restricted, and can be done by associating, a PUCCH resource activated with one or two spatial-relation-info and PRI bit-field indicating a PUCCH resource, or a PUCCH resource with one or two power control parameter sets and PRI bit-field indicating a PUCCH resource For single DCI based M-TRP PUSCH repetition schemes, in codebook based PUSCH, Support two SRI fields corresponding to two SRS resource sets are included in DCI formats 0_1/0_2.

1. Each SRI field indicating SRI per TRP, where the SRI field based on Rel-15/16 framework Support dynamic switching between multi-TRP and single-TRP operation Strive to reuse the specification support for dynamic indication of number of repetitions introduced in the Rel-17 coverage enhancement work item for multi-TRP operation. Decide whether further enhancements for multi-TRP operation are necessary in RAN1 #106bis. No further discussion on this topic until RAN1 #106bis under agenda item 8.1.

For single DCI based M-TRP PUSCH Type B repetition schemes,

For maxRank=2, the number of bits for the indication of PTRS-DMRS association is the same as Rel-15/16, MSB and LSB separately indicating the association between PTRS port and DMRS port for two TRPs.

For s-DCI based multi-TRP PUSCH repetition Type A and B, if the DCI schedules A-CSI, support multiplexing A-CSI on the first PUSCH repetition corresponding to the first beam and the X-th PUSCH repetition corresponding to the second beam.

For PUSCH repetition Type A, X=1 (the first PUSCH repetition corresponding to the second beam)

For PUSCH repetition Type B, the first actual PUSCH repetition corresponding to the first beam and the X-th actual repetition corresponding to the second beam are considered, 1. The UE does not expect the first actual repetition corresponding to the first beam and the X-th actual repetition corresponding to the second beam to have a single symbol duration (similar restriction as in Rel-16 NR for the single TRP case).

2. The first actual repetition corresponding to the first beam and the X-th actual repetition corresponding to the second beam are expected to have the same number of symbols For single DCI based M-TRP PUSCH repetition schemes, in codebook based PUSCH, Two TPMI fields are indicated in DCI formats 0_1/0_2.

1. The first TPMI field uses the Rel-15/16 TPMI field design (which includes TPMI index and the number of layers) of DCI format 0_1/0_2. The second TPMI field only contains/indicates the second TPMI index. The same number of layers are applied as indicated in the first TPMI field.

For single DCI based M-TRP PUSCH repetition schemes, in non-codebook based PUSCH:

Support two SRI field(s) corresponding to two SRS resource sets are included in DCI formats 0_1/0_2.

1. Each SRI field indicating SRI per TRP, where the first SRI field based on Rel-15/16 framework, 2. Support the same number of layers applied over repetitions Support dynamic switching between multi-TRP and single-TRP operation For beam mapping/power control parameter set mapping for PUCCH repetitions, For M-TRP PUCCH Scheme 1 in FR1, it is possible to configure either cyclic mapping or sequential mapping of power control parameter sets over PUCCH repetitions (similar to spatial relation info's over PUCCH repetitions).

For M-TRP PUCCH Scheme 3, reuse the same methods as Scheme 1 (by replacing slots with sub-slots) for beam mapping or power control resource set mapping to sub-slots.

This working assumption is also subjected to the RAN4 LS R1-2009807 and confirmed based on the RAN4 reply.

The solutions described herein deal with full-duplex operation for UE where at least one UL transmission is scheduled to one TRP/beam and one DL reception is scheduled from another TRP/beam on the same set of time symbols. The proposed solution further includes:

a single UL-DL RS resource/resource set is proposed to configure same resources for simultaneous UL and DL, but with different beams/TRPs UE reporting enhancements to indicate at least a pair of TRPs/beams suitable for UE FD operation Enhancements for single DCI based UE FD operation from/to multiple TRPs Enhancements for multi-DCI based UE FD operation from/to multiple TRPs One of the main benefits of the proposed solutions in this disclosure, in one embodiment, includes facilitating a FD UE operation by determining a suitable pair of TRPs/beams to minimize the self-interference at the UE when transmitting DL to one TRP and receiving UL on another TRP at the same time. M-TRP for URLLC with FD UE operation would allow to achieve improved latency by exploiting the separation by directivity from/to different TRPs.

In further embodiments, another benefit of the proposed solution is that a single configuration is proposed for configuring a pair of UL-DL RS resource/resource set that can be utilized for self-interference measurement at the UE for FD operation using different Rx and Tx beams.

In a first embodiment, UL-DL RS pair configuration and corresponding reporting enhancements for TRP/beam pair indication for UE FD operation are disclosed.

According to the first embodiment, a UE is configured by the network to perform self-interference measurements caused by simultaneous UL transmission to at least one TRP/beam and DL reception from at least another TRP/beam, and report back to at least one pair of TRPs, wherein the TRP pair can be determined when the self-interference for UE FD operation with that TRP pair is below a network configured threshold value.

In one implementation of the first embodiment, the UE is configured by the network with a UL-DL RS resources/resource sets for self-interference measurement, where the UL-DL RS resource configuration contains at least:

One set of time-frequency resources

Time-domain behavior of UL-DL RS

QCL type-D assumption pair for at least one UL TRP/panel/beam and one DL TRP/panel/beam Number of ports Multiple pattern In some embodiments, a single RRC information element ("IE") is used to configure the UE with UL-DL RS resources/resource sets, wherein on UL resources, non-zero power ("NZP") RSs are transmitted on the UE UL Tx beam(s) (corresponding to UL transmission beams to TRP(s)), while on the DL resources, zero power ("ZP") RSs (muting) are used to measure the self-interference at the UE on UE DL Rx beam(s) (corresponding to DL reception beams from TRP(s)), where both UL/DL resources for NZP and ZP RS are allocated in the same time/frequency resources.

Figure 2:
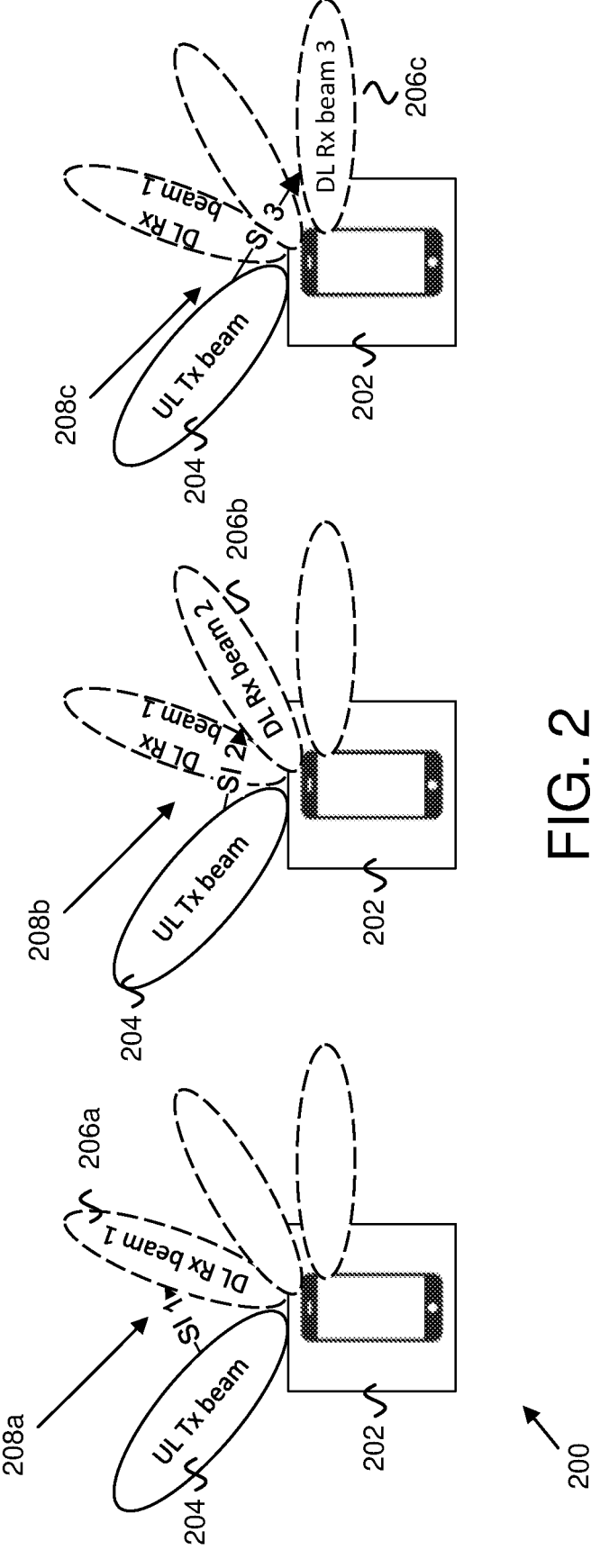
FIG. 2 is a diagram illustrating one embodiment of UL-DL RS pair with DL Rx beam sweeping and fixed UL Tx beam to measure self-interference for FD UE operation.

In one implementation, one UL-DL RS resource set contains multiple UL-DL RS resources, wherein the QCL type-D assumption for UL NZP RS is the same across all the resources within the one resource set and the QCL type-D assumption for DL ZP RS is different for each of the resources within the one resource set. For this case, an illustration is shown in FIG. 2, where the UE is effectively repeating UL NZP RS in time domain using the same UE Tx beam/panel 204 (for example in only one beam direction to one beam of one TRP) and for each repeated transmission of UL NZP RS, UE 202 is sweeping its UE DL Rx beam/panel 206*a-c* (for example corresponding to receiving DL from multiple beams from one or multiple TRPs) and measuring self-interference 208*a-c* on each of the beams.

In some embodiments, for each UL-DL RS resource set, a different QCL type-D assumption can be configured for UL NZP RS such that one resource set corresponds to one UE UL Tx beam/panel (corresponding associated TRP) and multiple DL ZP RS for each resource within a resource corresponds to multiple UE DL Rx beams/panels (corresponding associated TRP). Similarly, another resource set corresponds to another UE UL Tx beam/panel (corresponding to another associated beam of same or different TRP), but the multiple DL ZP RS for each resource within a resource corresponds to same set of UE DL Rx beams/panels (as with resources of first/one resource set).

Figure 3:
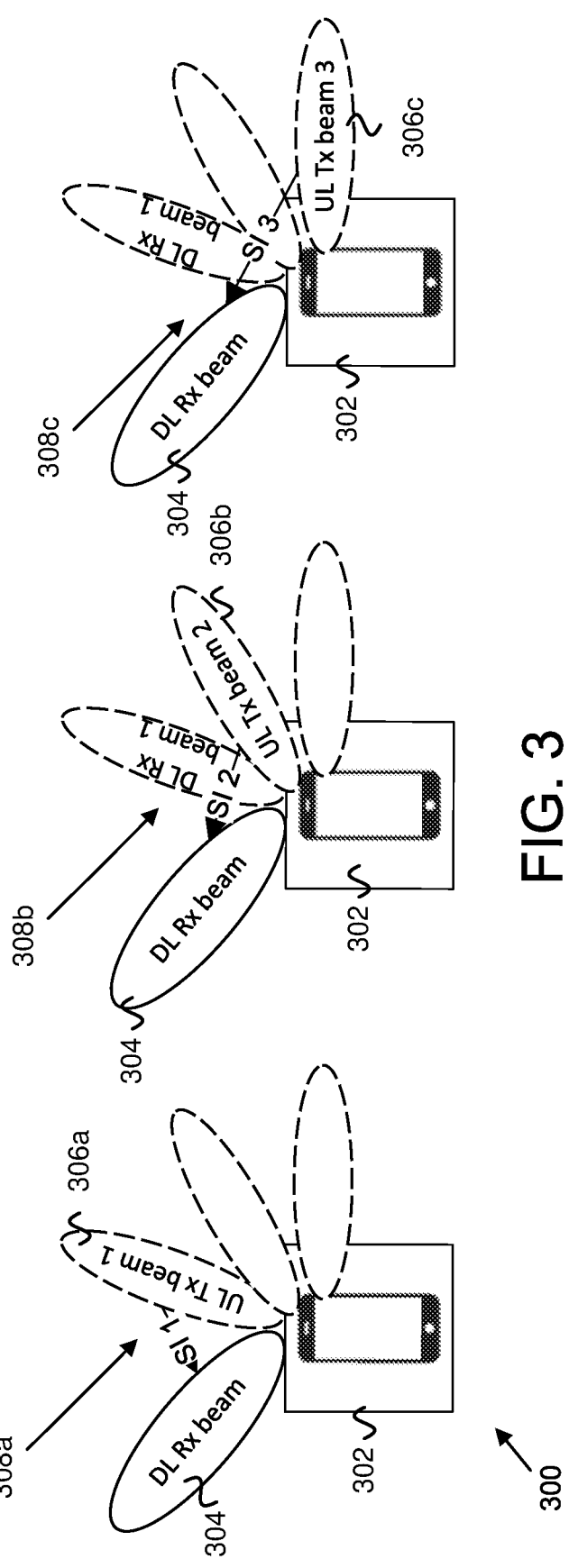
FIG. 3 is a diagram illustrating one embodiment of UL-DL RS pair with fixed DL Rx beam and UL Tx beam sweeping to measure self-interference for FD UE operation.

In another implementation, one UL-DL RS resource set contains multiple UL-DL RS resources, wherein the QCL type-D assumption for UL NZP RS is different across the resources within the one resource set and the QCL type-D assumption for DL ZP RS is same for each of the resource within the one resource set. For this case, an illustration is shown in FIG. 3, where the UE 302 is effectively repeating UL NZP RS in time domain using different UE Tx beam/panel 306*a-c* and for each repeated transmission of UL NZP RS, UE 302 is using the same UE DL Rx beam/panel 304 and measuring self-interference 308*a-c* on same beam corresponding to different UL NZP RS transmissions on different beams.

In some embodiments, for each UL-DL RS resource set, a different QCL type-D assumption can be configured for DL ZP RS such that one resource set corresponds to one UE DL Rx beam/panel and multiple UL NZP RS for each resource within a resource corresponds to multiple UE UL Tx beams/panels. Similarly, another resource set corresponds to another UE DL Rx beam/panel, but the multiple UL NZP RS for each resource within a resource corresponds to same set of UE UL Tx beams/panels (as with resources of first/one resource set).

In some embodiments, for a UL-DL RS resource, the QCL type-D assumption for the UL Tx beam is associated with one TRP and the QCL type-D assumption for the DL Rx beam is associated with a different TRP. In alternate embodiments, the QCL type-D assumption for both the UL Tx beam and DL Rx beam can be associated with different beams of the same TRP. In some embodiments, the UL-DL RS resource set corresponds to one TRP and the UL-DL RS resources within the set corresponds to different beams of one TRP. In some embodiments, the UL-DL RS resource or resource set can correspond to UE panels e.g., pair of DL Rx beam and corresponding UL Tx beam for FD operation is associated with two different UE panels.

In some other embodiments, UL RS resource and DL RS resource can be two separate configurations for facilitating self-interference at the UE. In one implementation, UL RS resource can be configured by a TRP that intends to receive UL transmission from the UE (assuming FD operation at the UE), while the DL RS resource can be configured by another TRP that intends to transmit DL transmission to the UE (assuming FD operation at the UE). In an alternate implementation, same TRP can configure DL RS and UL for self-interference measurement at the UE, but the actual UL and DL transmission could be either from the same TRP on different beams or in combination with another TRP.

In some of the embodiments, the UE is configured with UL-DL RS for self-interference estimation/reporting and self-interference compensation in the UE Rx baseband. The UE is configured with the NZP RS for UL and ZP RS for DL, and the density of the UL-DL RS in frequency and/or in time is based on the QCL type-D relation between the Tx/UL and Rx/DL beams, such that different densities of UL-DL RS are configured based on whether the Tx beam's spatial filter coefficients are close to those of the Rx beam or not, since different relations results in different channel between the Tx and Rx panels.

In some embodiments, UL-DL RS pair and beam sweeping operation to measure the self-interference and duplex scheduling could be restricted for inter-TRP operation, which means the DL and UL shall be received only from different TRPs. The UE could report the measured self-interference in CSI or medium access control ("MAC") control element ("CE") or RRC signaling to the primary TRP or multiple TRPs.

In some embodiments, UL-DL RS pair and beam sweeping operation to measure the self-interference and duplex scheduling could be enabled for intra-TRP when the self-interference is above a certain threshold. When full duplex is enabled, beam correspondence could be disabled, which means a separate Tx and Rx beam could be established.

In some of the above embodiments, and in one implementation, dedicated UL-DL RS for self-interference measurements are configured for the UE. In another implementation SRS or/and UL DMRS is used for interference measurement. The UE is configured with ZP DL RS resources on DL beam from one TRP corresponding with the UL SRS/DMRS of the UL beam to another TRP. The UE may be explicitly configured with the muted DL resources corresponding to a subset of UL RS or can autonomously assume that the resources corresponding to SRS or DMRS are muted in DL beam for performing self-interference measurements based on an indication from the network.

In some embodiments, the UE can be configured to perform beam sweeping operations to measure the self-interference over the UL-DL beam pairs in a low-Tx-power mode, within the time-frequency resources not dedicated to the UE for transmission. Thereby, the UL-DL beam pairs shall be refined before the dedicated measurements via the assigned UL-DL RS resources.

In some embodiments, the activation/deactivation of the low-Tx-power system information ("SI") probing can be activated/deactivated for the UE dynamically via DCI signaling, periodically or semi-statically via higher layer signaling. In some embodiments, the configuration for UE also includes a maximum Tx power during the low-Tx-power SI probing. In some embodiments, the low-Tx-power probing may co-exist with the same time-frequency resource for communications.

In some embodiments, the transmission and reception of UL-DL RS pairs can be done concurrently, e.g., transmission of at least two UL RS at the same time-frequency resource and the reception of at least one DL beam, or transmission of at least one UL RS at the same time-frequency resource and the reception of at least two DL beams.

A second embodiment of the proposed solution is directed to UL-DL beam/TRP pair reporting for UE FD operation.

According to the second embodiment, the UE is configured by the network to report at least one pair of UL Tx beams (corresponding to one TRP) and DL Rx beams (corresponding to the same one TRP or a different second TRP) for performing FD operation e.g., to receive DL from one beam/panel/TRP and transmit UL using a different beam.

In one implementation, the UE is configured by the network to report pair(s) of UL Tx beams and DL Rx beams for UE FD operation based on measurements of the UL-DL RS (described in the first embodiment above). In such an embodiment, the UE indicates at least one index associated with a UL-DL RS resource ID of a resource set, wherein the index corresponds to one pair of UL Tx beams and DL Rx beams. In another implementation, the UE reports at least one pair of TRPs e.g., one TRP for DL and another TRP for UL, wherein such an association can be based on the association of TRPs (based on CORESETPoolIndex) with UL-DL RS resource/resource set. In some embodiments, when only one pair of TRPs is indicated, but not specific beams, then the gNB can assume to use any beams from the TRP pair for UL and DL e.g., one UL beam from one TRP and one DL beam from another beam. In some embodiments, the UE also reports corresponding self-interference measurements along with a pair of beams/TRPs/panels for UL and DL in FD operation.

In an alternate implementation, a UE is configured with a fixed UL Tx beam for UL NZP RS transmission and multiple DL Rx beams for corresponding measurements on ZP RS, wherein the UE is configured to report one or multiple indices associated with the DL RS resource/resource set ID. In this case, the gNB is not explicitly indicated with the index associated with an UL RS (UL beam/TRP) and only required to report a DL RS index (e.g., DL beam(s)/TRP(s)). In addition, UE can be configured to report self-interference measurements corresponding to one or multiple DL RS indices.

In another implementation, a UE is configured with a fixed DL Rx beam for DL ZP RS for interference measurement and multiple UL Tx beams for transmission on NZP UL RS, wherein the UE is configured to report one or multiple indices associated with the UL RS resource/resource set ID. In this case, the gNB is not explicitly indicated with the index associated with DL RS (e.g., DL beam/TRP) and is only required to report an UL RS index (e.g., UL beam(s)/TRP(s)).

A third embodiment directed to single DCI based m-TRP enhancements for FD UE is disclosed.

According to the third embodiment, the UE is configured to monitor single DCI on at least one CORESET associated with one TRP (for example CORESETPoolIndex 0) to schedule FD operation for DL reception from one TRP (for example CORESETPoolIndex 0) and UL transmission to another TRP (for example CORESETPoolIndex 1).

In some embodiments, the UE is configured with UL-DL RS for self-interference measurement at the UE and corresponding reporting is activated/triggered to transmit UL RS, measure interference on DL RS, and report back configured quantities by the single DCI from one of the TRPs. In one implementation, the ports used for the UL RS transmission and DL RS interference measurement belong to different CDM groups e.g., they are not QCL-ed.

In some embodiments, DCI contains a field to indicate to the UE if FD operation is allowed or not for simultaneous UL transmission and DL reception at the UE. In alternate embodiments, FD operation is semi-statically configured, but dynamically implied to configuring at least one set of parameters in DCI for both DL and UL.

In some embodiments, a pair of DM-RS ports for UL transmission and DL reception at UE is indicated via DCI such that the DM-RS ports belong to different CDM groups e.g., non QCL-ed. In one implementation, DM-RS antenna port indication table is enhanced to indicate that at least 2 ports belong to two different CDM groups. In an alternate implementation, only one DM-RS port is indicated to the UE (for either UL or DL). In this case, the other DM-RS port is implied to be the DM-RS port index in the other CDM group. For example, it could be the lowest index of DM-RS port in lowest available CDM group that is not already indicated to the UE.

In some embodiments, only a single time-domain resource allocation field is indicated by the DCI that is applied for both DL and UL at the UE. In this case same number and location of time-domain symbols and same mapping type is expected to be applied for both UL and DL. In alternate embodiments, an additional offset is indicated with TDRA e.g., to indicate the shift for one link in time domain. For example, if the indicated TDRA is applied for DL, then the offset is applied to indicated DL TDRA and then the time domain resources for UL are determined (at least partial overlap on some time symbols is expected) or vice-versa.

In some embodiments, only a single frequency-domain resource allocation field is indicated by the DCI that is applied for both DL and UL at the UE. In this case, complete overlap for UL and DL in frequency domain is indicated. In alternate embodiments, an additional offset is indicated with FDRA e.g., to indicate the shift for one link in frequency. For example, if the indicated FDRA is applied for DL, then the offset is applied to indicated DL FDRA and then the frequency domain resources for UL are determined or vice-versa. Consequently, either partial overlap in frequency can be indicated or no overlap in frequency can be indicated or complete overlap (when no offset is indicated) in frequency can be indicated.

In some embodiments, UE can be configured to have FD operation with the following combinations:

PDSCH in DL and PUSCH in UL

PDSCH in DL and PUCCH in UL

PDSCH in DL and SRS in UL

PDCCH in DL and PUSCH in UL

PDCCH in DL and PUCCH in UL

PDCCH in DL and SRS in UL

CSI-RS in DL and PUSCH in UL

CSI-RS in DL and PUCCH in UL

CSI-RS in DL and SRS in UL

In some embodiments, only some of the above combinations are allowed depending upon traffic type and/or priority associated with traffic and/or self-interference measurements at the UE.

In some alternate embodiments, the UE is scheduled with DL reception and UL transmission from/to the same TRP with different beams. The above embodiments/implementations are also applicable for this scenario.

A fourth embodiment is directed to multi-DCI based m-TRP enhancements for FD UE.

According to the fourth embodiment, the UE can be scheduled with DL reception by one TRP and can be scheduled with UL transmission by another TRP. In one implementation, the UE is expected to perform FD operation based on multi-DCI indication from different TRPs under following conditions that should be met (basically, the UE is not expected to be configured with FD operation and different conditions than below):

DM-RS ports indicated for DL reception by DL scheduling DCI by one TRP should be in different CDM groups in comparison to the DM-RS ports and CDM groups indicated for UL transmission by UL grant DCI by another TRP;

At least partial overlap in time-domain symbols should be scheduled by the two DCIs from two TRPs; and/or UE DL Rx beam and UE UL Tx beam indicated by the DL scheduling DCI and/or UL grant DCI should not be QCL-ed with type D assumption.

If one of the above conditions is not met, then the UE is not expected to perform FD operations for simultaneous UL transmission and DL reception.

Figure 4:
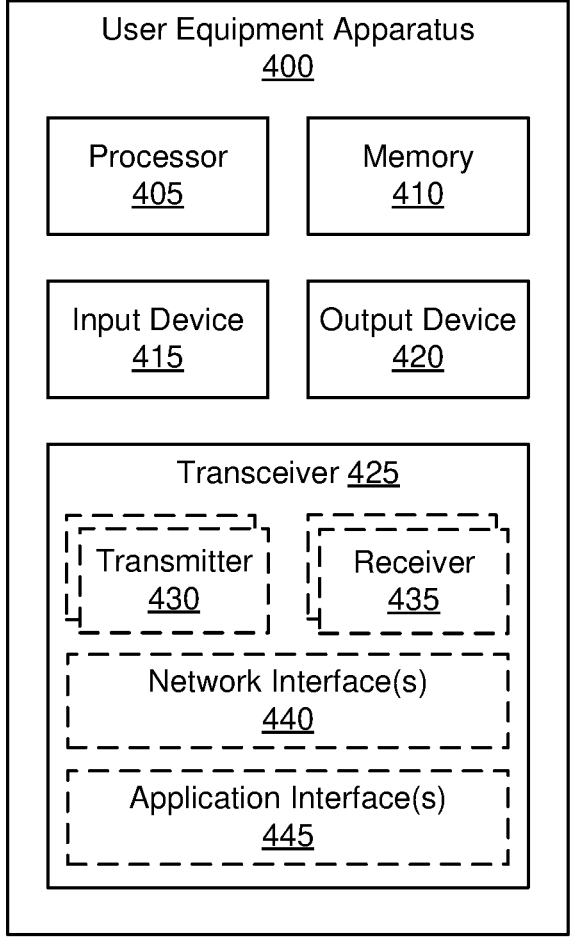
FIG. 4 is a block diagram illustrating one embodiment of a user equipment apparatus that may be used for full-duplex user equipment operation.

FIG. 4 depicts a user equipment apparatus 400 that may be used for full-duplex user equipment operation, according to embodiments of the disclosure. In various embodiments, the user equipment apparatus 400 is used to implement one or more of the solutions described above. The user equipment apparatus 400 may be one embodiment of a UE, such as the remote unit 105 and/or the UE 205, as described above. Furthermore, the user equipment apparatus 400 may include a processor 405, a memory 410, an input device 415, an output device 420, and a transceiver 425. In some embodiments, the input device 415 and the output device 420 are combined into a single device, such as a touch-screen. In certain embodiments, the user equipment apparatus 400 may not include any input device 415 and/or output device 420. In various embodiments, the user equipment apparatus 400 may include one or more of: the processor 405, the memory 410, and the transceiver 425, and may not include the input device 415 and/or the output device 420.

As depicted, the transceiver 425 includes at least one transmitter 430 and at least one receiver 435. Here, the transceiver 425 communicates with one or more base units 121. Additionally, the transceiver 425 may support at least one network interface 440 and/or application interface 445. The application interface(s) 445 may support one or more APIs. The network interface(s) 440 may support 3GPP reference points, such as Uu and PC5. Other network interfaces 440 may be supported, as understood by one of ordinary skill in the art.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), a digital signal processor ("DSP"), a co-processor, an application-specific processor, or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425. In certain embodiments, the processor 405 may include an application processor (also known as "main processor") which manages application-domain and operating system ("OS") functions and a base-band processor (also known as "baseband radio processor") which manages radio functions.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data related to CSI enhancements for higher frequencies. For example, the memory 410 may store parameters, configurations, resource assignments, policies, and the like as described above. In certain embodiments, the memory 410 also stores program code and related data, such as an operating system or other controller algorithms operating on the user equipment apparatus 400, and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touch-screen and/or by handwriting on the touchscreen. In some embodiments, the input device 415 includes two or more different devices, such as a keyboard and a touch panel.

The output device 420, in one embodiment, is designed to output visual, audible, and/or haptic signals. In some embodiments, the output device 420 includes an electronically controllable display or display device capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display separate from, but communicatively coupled to, the rest of the user equipment apparatus 400, such as a smart watch, smart glasses, a heads-up display, or the like. Further, the output device 420 may be a component of a smart phone, a personal digital assistant, a television, a table computer, a notebook (laptop) computer, a personal computer, a vehicle dash-board, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

The transceiver 425 includes at least transmitter 430 and at least one receiver 435. The transceiver 425 may be used to provide UL communication signals to a base unit 121 and to receive DL communication signals from the base unit 121, as described herein. Similarly, the transceiver 425 may be used to transmit and receive SL signals (e.g., V2X communication), as described herein. Although only one transmitter 430 and one receiver 435 are illustrated, the user equipment apparatus 400 may have any suitable number of transmitters 430 and receivers 435. Further, the transmitter(s) 430 and the receiver(s) 435 may be any suitable type of transmitters and receivers. In one embodiment, the transceiver 425 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 425, transmitters 430, and receivers 435 may be implemented as physically separate components that access a shared hardware resource and/or software resource, such as for example, the network interface 440.

In various embodiments, one or more transmitters 430 and/or one or more receivers 435 may be implemented and/or integrated into a single hardware component, such as a multi-transceiver chip, a system-on-a-chip, an ASIC, or other type of hardware component. In certain embodiments, one or more transmitters 430 and/or one or more receivers 435 may be implemented and/or integrated into a multi-chip module. In some embodiments, other components such as the network interface 440 or other hardware components/circuits may be integrated with any number of transmitters 430 and/or receivers 435 into a single chip. In such embodiment, the transmitters 430 and receivers 435 may be logically configured as a transceiver 425 that uses one more common control signals or as modular transmitters 430 and receivers 435 implemented in the same hardware chip or in a multi-chip module.

In one embodiment, the transceiver 425 receives a joint configuration from a network defining uplink ("UL") and downlink ("DL") reference signal ("RS") resources for facilitating self-interference measurements at the UE for full-duplex UE operation and the processor 405 performs self-interference measurements according to the received joint configuration. In one embodiment, the transceiver 425 reports at least one UE UL Tx beam and UE DL Rx beam pair and receives at least one downlink control information ("DCI") for UE full-duplex operation for simultaneous UL transmission and DL reception associated with two beams of at least one transmit/receive point ("TRP") based on the reported at least one UE UL Tx beam and UE DL Rx beam pair.

In one embodiment, the joint configuration comprises at least one pair of QCL type-D assumptions associated with one or more of a pair of beams, a pair of TRPs, and a pair of UE panels.

In one embodiment, for the at least one UE UL Tx beam and UE DL Rx beam pair, one or more of the UE UL Tx beam is associated with a first TRP, the UE DL Rx beam is different than UE UL Tx beam and associated with the first TRP, and the UE DL Rx beam is associated with a second TRP.

In one embodiment, the two beams of at least one TRP comprises one or more of two different beams of one TRP and two beams from two TRPs.

In one embodiment, the processor 405 configures the UE with one beam for UE UL Tx beam for UL non-zero power ("NZP") RS transmission and corresponding one or more beams for UE DL Rx beams for interference measurements on DL zero power ("ZP") RS.

In one embodiment, the joint configuration of self-interference measurements at the UE for full-duplex operation comprises at least one of an indication of a reduced-power measurement state, a maximum transmit power level, and a set of UL and DL time/frequency resources for measurements.

In one embodiment, the processor 405 configures the UE with one beam for UE DL Rx beam for interference measurements on DL zero power ("ZP") RS and corresponding one or more beams for UE UL Tx beams for UL non-zero power ("NZP") RS.

In one embodiment, the processor 405 configures the UE to report at least one resource index to indicate a pair of UL Tx beam and DL Rx beam for UE full-duplex operation, wherein the UL Tx beam reported back is associated with one TRP and DL Rx beam reported back is associated with another TRP.

In one embodiment, the transceiver 425 receives a single DCI to schedule simultaneous UE UL transmissions to one TRP and UE DL receptions from another TRP for UE full-duplex operation.

In one embodiment, the transceiver 425 receives multiple DCIs to schedule simultaneous UE UL transmissions to one TRP and UE DL receptions from another TRP for UE full-duplex operation.

In one embodiment, the processor 405 configures the UE with a first demodulation RS ("DM-RS") port for UL transmission and a second DM-RS port for DL reception, wherein the first and second DM-RS ports are not quasi co-located and belong to different code division multiplexing ("CDM") groups.

Figure 5:
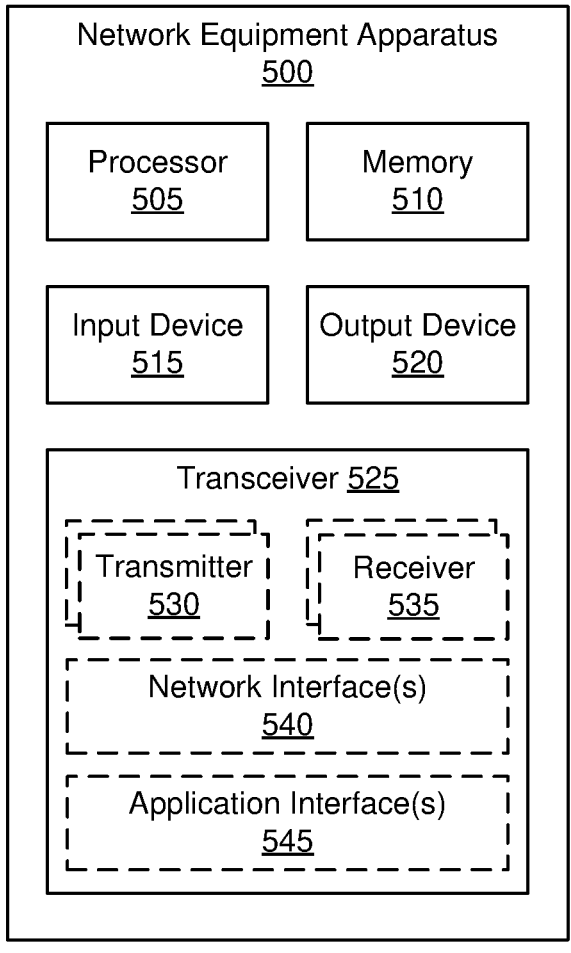
FIG. 5 is a block diagram illustrating one embodiment of a network apparatus that may be used for full-duplex user equipment operation.

FIG. 5 depicts one embodiment of a network apparatus 500 that may be used for full-duplex user equipment operation, according to embodiments of the disclosure. In some embodiments, the network apparatus 500 may be one embodiment of a RAN node and its supporting hardware, such as the base unit 121 and/or gNB, described above. Furthermore, network apparatus 500 may include a processor 505, a memory 510, an input device 515, an output device 520, and a transceiver 525. In certain embodiments, the network apparatus 500 does not include any input device 515 and/or output device 520.

As depicted, the transceiver 525 includes at least one transmitter 530 and at least one receiver 535. Here, the transceiver 525 communicates with one or more remote units 105. Additionally, the transceiver 525 may support at least one network interface 540 and/or application interface 545. The application interface(s) 545 may support one or more APIs. The network interface(s) 540 may support 3GPP reference points, such as Uu, N1, N2, N3, N5, N6 and/or N7 interfaces. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), a digital signal processor ("DSP"), a co-processor, an application-specific processor, or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525. In certain embodiments, the processor 505 may include an application processor (also known as "main processor") which manages application-domain and operating system ("OS") functions and a baseband processor (also known as "baseband radio processor") which manages radio function. In various embodiments, the processor 505 controls the network apparatus 500 to implement the above-described network entity behaviors (e.g., of the gNB) for full-duplex user equipment operation.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data relating to CSI enhancements for higher frequencies. For example, the memory 510 may store parameters, configurations, resource assignments, policies, and the like as described above. In certain embodiments, the memory 510 also stores program code and related data, such as an operating system ("OS") or other controller algorithms operating on the network apparatus 500, and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the transceiver 525 may communicate with one or more remote units and/or with one or more interworking functions that provide access to one or more PLMNs. The transceiver 525 may also communicate with one or more network functions (e.g., in the mobile core network 80). The transceiver 525 operates under the control of the processor 505 to transmit messages, data, and other signals and also to receive messages, data, and other signals. For example, the processor 505 may selectively activate the transceiver (or portions thereof) at particular times in order to send and receive messages.

The transceiver 525 may include one or more transmitters 530 and one or more receivers 535. In certain embodiments, the one or more transmitters 530 and/or the one or more receivers 535 may share transceiver hardware and/or circuitry. For example, the one or more transmitters 530 and/or the one or more receivers 535 may share antenna(s), antenna tuner(s), amplifier(s), filter(s), oscillator(s), mixer(s), modulator/demodulator(s), power supply, and the like. In one embodiment, the transceiver 525 implements multiple logical transceivers using different communication protocols or protocol stacks, while using common physical hardware.

In one embodiment, the transceiver 525 transmits a joint configuration to a user equipment ("UE") device defining uplink ("UL") and downlink ("DL") reference signal ("RS") resources for facilitating self-interference measurements at the UE for full-duplex UE operation, receives at least one UE UL Tx beam and UE DL Rx beam pair from the UE, and transmits at least one downlink control information ("DCI") for UE full-duplex operation for simultaneous UL transmission and DL reception associated with two beams of at least one transmit/receive point ("TRP") based on the reported at least one UE UL Tx beam and UE DL Rx beam pair.

FIG. 6 is a flowchart diagram of a method 600 for full-duplex user equipment operation. The method 600 may be performed by a UE as described herein, for example, the remote unit 105 and/or the user equipment apparatus 400. In some embodiments, the method 600 may be performed by a processor executing program code, for example, a microcontroller, a microprocessor, a CPU, a GPU, an auxiliary processing unit, a FPGA, or the like.

In one embodiment, the method 600 begins and receives 605 a joint configuration from a network defining uplink ("UL") and downlink ("DL") reference signal ("RS") resources for facilitating self-interference measurements at the UE for full-duplex UE operation. In one embodiment, the method 600 performs 610 self-interference measurements according to the received joint configuration. In one embodiment, the method 600 reports 615 at least one UE UL Tx beam and UE DL Rx beam pair. In one embodiment, the method 600 receives 620 at least one downlink control information ("DCI") for UE full-duplex operation for simultaneous UL transmission and DL reception associated with two beams of at least one transmit/receive point ("TRP") based on the reported at least one UE UL Tx beam and UE DL Rx beam pair, and the method 600 ends.

A first apparatus is disclosed for full-duplex user equipment operation. The first apparatus may include a UE as described herein, for example, the remote unit 105 and/or the user equipment apparatus 400. In some embodiments, the first apparatus may include a processor executing program code, for example, a microcontroller, a microprocessor, a CPU, a GPU, an auxiliary processing unit, a FPGA, or the like.

In one embodiment, the first apparatus includes a transceiver that receives a joint configuration from a network defining uplink ("UL") and downlink ("DL") reference signal ("RS") resources for facilitating self-interference measurements at the UE for full-duplex UE operation and a processor that performs self-interference measurements according to the received joint configuration. In one embodiment, the transceiver reports at least one UE UL Tx beam and UE DL Rx beam pair and receives at least one downlink control information ("DCI") for UE full-duplex operation for simultaneous UL transmission and DL reception associated with two beams of at least one transmit/receive point ("TRP") based on the reported at least one UE UL Tx beam and UE DL Rx beam pair.

In one embodiment, the joint configuration comprises at least one pair of QCL type-D assumptions associated with one or more of a pair of beams, a pair of TRPs, and a pair of UE panels.

In one embodiment, for the at least one UE UL Tx beam and UE DL Rx beam pair, one or more of the UE UL Tx beam is associated with a first TRP, the UE DL Rx beam is different than UE UL Tx beam and associated with the first TRP, and the UE DL Rx beam is associated with a second TRP.

In one embodiment, the two beams of at least one TRP comprises one or more of two different beams of one TRP and two beams from two TRPs.

In one embodiment, the processor configures the UE with one beam for UE UL Tx beam for UL non-zero power ("NZP") RS transmission and corresponding one or more beams for UE DL Rx beams for interference measurements on DL zero power ("ZP") RS.

In one embodiment, the joint configuration of self-interference measurements at the UE for full-duplex operation comprises at least one of an indication of a reduced-power measurement state, a maximum transmit power level, and a set of UL and DL time/frequency resources for measurements.

In one embodiment, the processor configures the UE with one beam for UE DL Rx beam for interference measurements on DL zero power ("ZP") RS and corresponding one or more beams for UE UL Tx beams for UL non-zero power ("NZP") RS.

In one embodiment, the processor configures the UE to report at least one resource index to indicate a pair of UL Tx beam and DL Rx beam for UE full-duplex operation, wherein the UL Tx beam reported back is associated with one TRP and DL Rx beam reported back is associated with another TRP.

In one embodiment, the transceiver receives a single DCI to schedule simultaneous UE UL transmissions to one TRP and UE DL receptions from another TRP for UE full-duplex operation.

In one embodiment, the transceiver receives multiple DCIs to schedule simultaneous UE UL transmissions to one TRP and UE DL receptions from another TRP for UE full-duplex operation.

In one embodiment, the processor configures the UE with a first demodulation RS ("DM-RS") port for UL transmission and a second DM-RS port for DL reception, wherein the first and second DM-RS ports are not quasi co-located and belong to different code division multiplexing ("CDM") groups.

A first method is disclosed for full-duplex user equipment operation. The first method may be performed by a UE as described herein, for example, the remote unit 105 and/or the user equipment apparatus 400. In some embodiments, the first method may be performed by a processor executing program code, for example, a microcontroller, a microprocessor, a CPU, a GPU, an auxiliary processing unit, a FPGA, or the like.

In one embodiment, the first method receives a joint configuration from a network defining uplink ("UL") and downlink ("DL") reference signal ("RS") resources for facilitating self-interference measurements at the UE for full-duplex UE operation and a processor that performs self-interference measurements according to the received joint configuration. In one embodiment, the first method reports at least one UE UL Tx beam and UE DL Rx beam pair and receives at least one downlink control information ("DCI") for UE full-duplex operation for simultaneous UL transmission and DL reception associated with two beams of at least one transmit/receive point ("TRP") based on the reported at least one UE UL Tx beam and UE DL Rx beam pair.

In one embodiment, the joint configuration comprises at least one pair of QCL type-D assumptions associated with one or more of a pair of beams, a pair of TRPs, and a pair of UE panels.

In one embodiment, for the at least one UE UL Tx beam and UE DL Rx beam pair, one or more of the UE UL Tx beam is associated with a first TRP, the UE DL Rx beam is different than UE UL Tx beam and associated with the first TRP, and the UE DL Rx beam is associated with a second TRP.

In one embodiment, the two beams of at least one TRP comprises one or more of two different beams of one TRP and two beams from two TRPs.

In one embodiment, the first method configures the UE with one beam for UE UL Tx beam for UL non-zero power ("NZP") RS transmission and corresponding one or more beams for UE DL Rx beams for interference measurements on DL zero power ("ZP") RS.

In one embodiment, the joint configuration of self-interference measurements at the UE for full-duplex operation comprises at least one of an indication of a reduced-power measurement state, a maximum transmit power level, and a set of UL and DL time/frequency resources for measurements.

In one embodiment, the first method configures the UE with one beam for UE DL Rx beam for interference measurements on DL zero power ("ZP") RS and corresponding one or more beams for UE UL Tx beams for UL non-zero power ("NZP") RS.

In one embodiment, the first method configures the UE to report at least one resource index to indicate a pair of UL Tx beam and DL Rx beam for UE full-duplex operation, wherein the UL Tx beam reported back is associated with one TRP and DL Rx beam reported back is associated with another TRP.

In one embodiment, the first method receives a single DCI to schedule simultaneous UE UL transmissions to one TRP and UE DL receptions from another TRP for UE full-duplex operation.

In one embodiment, the first method receives multiple DCIs to schedule simultaneous UE UL transmissions to one TRP and UE DL receptions from another TRP for UE full-duplex operation.

In one embodiment, the first method configures the UE with a first demodulation RS ("DM-RS") port for UL transmission and a second DM-RS port for DL reception, wherein the first and second DM-RS ports are not quasi co-located and belong to different code division multiplexing ("CDM") groups.

A second apparatus is disclosed for full-duplex user equipment operation. The second apparatus may include a network device as described herein, for example, the base unit 121 or the network equipment apparatus 500. In some embodiments, the second apparatus may include a processor executing program code, for example, a microcontroller, a microprocessor, a CPU, a GPU, an auxiliary processing unit, a FPGA, or the like.

In one embodiment, the second apparatus includes a transceiver that transmits a joint configuration to a user equipment ("UE") device defining uplink ("UL") and downlink ("DL") reference signal ("RS") resources for facilitating self-interference measurements at the UE for full-duplex UE operation, receives at least one UE UL Tx beam and UE DL Rx beam pair from the UE, and transmits at least one downlink control information ("DCI") for UE full-duplex operation for simultaneous UL transmission and DL reception associated with two beams of at least one transmit/receive point ("TRP") based on the reported at least one UE UL Tx beam and UE DL Rx beam pair.

A second method is disclosed for full-duplex user equipment operation. The second method may be performed by a network device as described herein, for example, the base unit 121 or the network equipment apparatus 500. In some embodiments, the second method may be performed by a processor executing program code, for example, a microcontroller, a microprocessor, a CPU, a GPU, an auxiliary processing unit, a FPGA, or the like.

In one embodiment, the second method transmits a joint configuration to a user equipment ("UE") device defining uplink ("UL") and downlink ("DL") reference signal ("RS") resources for facilitating self-interference measurements at the UE for full-duplex UE operation, receives at least one UE UL Tx beam and UE DL Rx beam pair from the UE, and transmits at least one downlink control information ("DCI") for UE full-duplex operation for simultaneous UL transmission and DL reception associated with two beams of at least one transmit/receive point ("TRP") based on the reported at least one UE UL Tx beam and UE DL Rx beam pair.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:
    at least one memory; and
    at least one processor coupled with the at least one memory and configured to cause the UE to:
        receive a joint configuration that defines a paired uplink ("UL") reference signal ("RS") resource and a paired downlink ("DL") RS resource for self-interference measurement in a full-duplex operation, wherein the paired UL RS resource is associated with a UL transmit ("Tx") beam and the paired DL RS resource is associated with a DL receive ("Rx") beam that is different from the UL transmit beam;
        perform a self-interference measurement using the paired UL RS resource and the paired DL RS resource that are configured within a same symbol and that occupy overlapping or non-overlapping frequency resources within the symbol;
        report an indication identifying the UL Tx beam and the DL Rx beam as a beam pair based on the self-interference measurement; and
        receive at least one downlink control information ("DCI") that schedules simultaneous UL transmission and DL reception in the full-duplex operation based on the beam pair.

2. The UE of claim 1, wherein the joint configuration comprises at least one pair of quasi co-located (QCL) type-D assumptions associated with a pair of beams, a pair of TRPs, or a pair of panels, or a combination thereof.

3. The UE of claim 1, wherein, for the beam pair, the UL Tx beam is associated with a first TRP, the DL Rx beam is different than the UL Tx beam and associated with the first TRP, the DL Rx beam is associated with a second TRP, or a combination thereof.

4. The UE of claim 1, wherein the at least two beams of at least one TRP comprises two different beams of one TRP, two beams from two TRPs, or a combination thereof.

5. The UE of claim 1, wherein the UL Tx beam of the UL Tx beam and DL Rx beam pair is configured for UL non-zero power ("NZP") RS transmission and the DL Rx beam of the UL Tx beam and DL Rx beam pair is configured for the self-interference measurement on DL zero power ("ZP") RS.

6. The UE of claim 1, wherein the joint configuration for self-interference measurement for the full-duplex operation comprises an indication of a reduced-power measurement state, a maximum transmit power level, a set of UL and DL resources for the self-interference measurement, or a combination thereof.

7. The UE of claim 1, wherein the DL Rx beam of the UL Tx beam and DL Rx beam pair is configured for the self-interference measurement on DL zero power ("ZP") RS and the UL Tx beam of the UL Tx beam and DL Rx beam pair is configured for UL non-zero power ("NZP") RS.

8. The UE of claim 1, wherein the at least one processor is configured to cause the UE to report at least one resource index to indicate the UL Tx beam and DL Rx beam pair, wherein the UL Tx beam is associated with a first TRP and the DL Rx beam is associated with a second TRP.

9. The UE of claim 1, wherein the at least one processor is configured to cause the UE to receive a single DCI to schedule a simultaneous UL transmission to a first TRP and DL reception from a second TRP for the full-duplex operation.

10. The UE of claim 1, wherein the at least one processor is configured to cause the UE to receive multiple DCIs to schedule a simultaneous UL transmission to a first TRP and a DL receptions from a second TRP for the full-duplex operation.

11. The UE of claim 1, wherein the at least one processor is configured to cause the UE to configure the UE with a first demodulation RS ("DM-RS") port for UL transmission and a second DM-RS port for DL reception, wherein the first DM-RS port and the second DM-RS port are not quasi co-located ("QCL'd") and correspond to different code division multiplexing ("CDM") groups.

12. A method performed by a user equipment ("UE"), the method comprising:
    receiving a joint configuration that defines a paired uplink ("UL") reference signal ("RS") resource and a paired downlink ("DL") RS resource for self-interference measurement in a full-duplex operation, wherein the paired UL RS resource is associated with a UL transmit ("Tx") beam and the paired DL RS resource is associated with a DL receive ("Rx") beam that is different from the UL transmit beam;
    performing a self-interference measurement using the paired UL RS resource and the paired DL RS resource that are configured within a same symbol and that occupy overlapping or non-overlapping frequency resources within the symbol;
    reporting an indication identifying the UL Tx beam and the DL Rx beam as a beam pair based on the self-interference measurement; and receiving at least one downlink control information ("DCI") that schedules simultaneous UL transmission and DL reception in the full-duplex operation based on the beam pair.

13. The method of claim 12, wherein the joint configuration comprises at least one pair of quasi co-located (QCL) type-D assumptions associated with a pair of beams, a pair of TRPs, or a pair of panels, or a combination thereof.

14. The method of claim 12, wherein:

at least two beams of at least one TRP comprises two different beams of one TRP, two beams from two TRPs, or a combination thereof;

for the beam pair, the UL Tx beam is associated with a first TRP, the DL Rx beam is different than the UL Tx beam and associated with the first TRP, the DL Rx beam is associated with a second TRP, or a combination thereof; or a combination thereof.

15. The method of claim 12, wherein the joint configuration for self-interference measurement for the full-duplex operation comprises an indication of a reduced-power measurement state, a maximum transmit power level, a set of UL and DL resources for the self-interference measurement, or a combination thereof.

16. The method of claim 12, wherein (of the UL Tx beam and DL Rx beam pair is configured for the self-interference measurement on DL zero power ("ZP") RS and the UL Tx beam of the UL Tx beam and DL Rx beam pair is configured for UL non-zero power ("NZP") RS.

17. The method of claim 12, wherein the at least two beams of at least one TRP comprises two different beams of one TRP, two beams from two TRPs, or a combination thereof.

18. The method of claim 12, wherein the UL Tx beam of the UL Tx beam and DL Rx beam pair is configured for UL non-zero power ("NZP") RS transmission and the DL Rx beam of the UL Tx beam and DL Rx beam pair is configured for the self-interference measurement on DL zero power ("ZP") RS.

19. A network equipment for wireless communication, comprising:

at least one memory; and at least one processor coupled with the at least one memory and configured to cause the network equipment to:

transmit a joint configuration that defines a paired uplink ("UL") reference signal ("RS") resource and a paired downlink ("DL") resource for self-interference measurement for full-duplex operation, wherein the paired UL RS resource is associated with a UL transmit ("Tx") beam and the paired DL RS resource is associated with a DL receive ("Rx") beam that is different from the UL Tx beam, and wherein the paired UL RS resource and the paired DL RS resource are configured within a same symbol and occupy overlapping or non-overlapping frequency resources within the symbol;

receive an indication identifying the UL Tx beam and DL Rx beam as a beam pair based on a self-interference measurement performed by a user equipment (UE) using the paired UL and DL reference signal resources; and transmit at least one downlink control information ("DCI") that schedules simultaneous UL transmission and DL reception in the full-duplex operation based on the beam pair.

20. A method performed by a network equipment, comprising:

transmitting a joint configuration that defines a paired uplink ("UL") reference signal ("RS") resource and a paired downlink ("DL") RS resource for self-interference measurement for full-duplex operation, wherein the paired UL RS resource is associated with a UL transmit ("Tx") beam and the paired DL RS resource is associated with a DL receive ("Rx") beam that is different from the UL Tx beam, and wherein the paired UL RS resource and the paired DL RS resource are configured within a same symbol and occupy overlapping or non-overlapping frequency resources within the symbol;

receiving an indication identifying the UL Tx beam and DL Rx beam as a beam pair based on a self-interference measurement performed by a user equipment (UE) using the paired UL and DL reference signal resources; and transmitting at least one downlink control information ("DCI") that schedules simultaneous UL transmission and DL reception in the full-duplex operation based on the beam pair.

* * * * *